NOAH PARKER.
Raising and lowering Gate Hinge & Latch.

112843  PATENTED MAR 21 1871

Attest.  Noah Parker.  Inventor.

United States Patent Office.

NOAH PARKER, OF TRIMBLE COUNTY, KENTUCKY.

Letters Patent No. 112,843, dated March 21, 1871.

IMPROVEMENT IN GATES.

The Schedule referred to in these Letters Patent and making part of the same.

I, NOAH PARKER, of the county of Trimble and State of Kentucky, have invented certain Improvements in Gates, of which the following is a specification.

My invention relates to gates which are made vertically adjustable for various purposes.

The improvement consists in the particular construction and arrangement of parts, whereby the gate is at all times and under all adjustments to be latched with uniform facility and security.

The means for effecting the desired result are simple, and easily applied and adjusted.

Like letters of reference designate corresponding parts in both figures.

Figure 1:
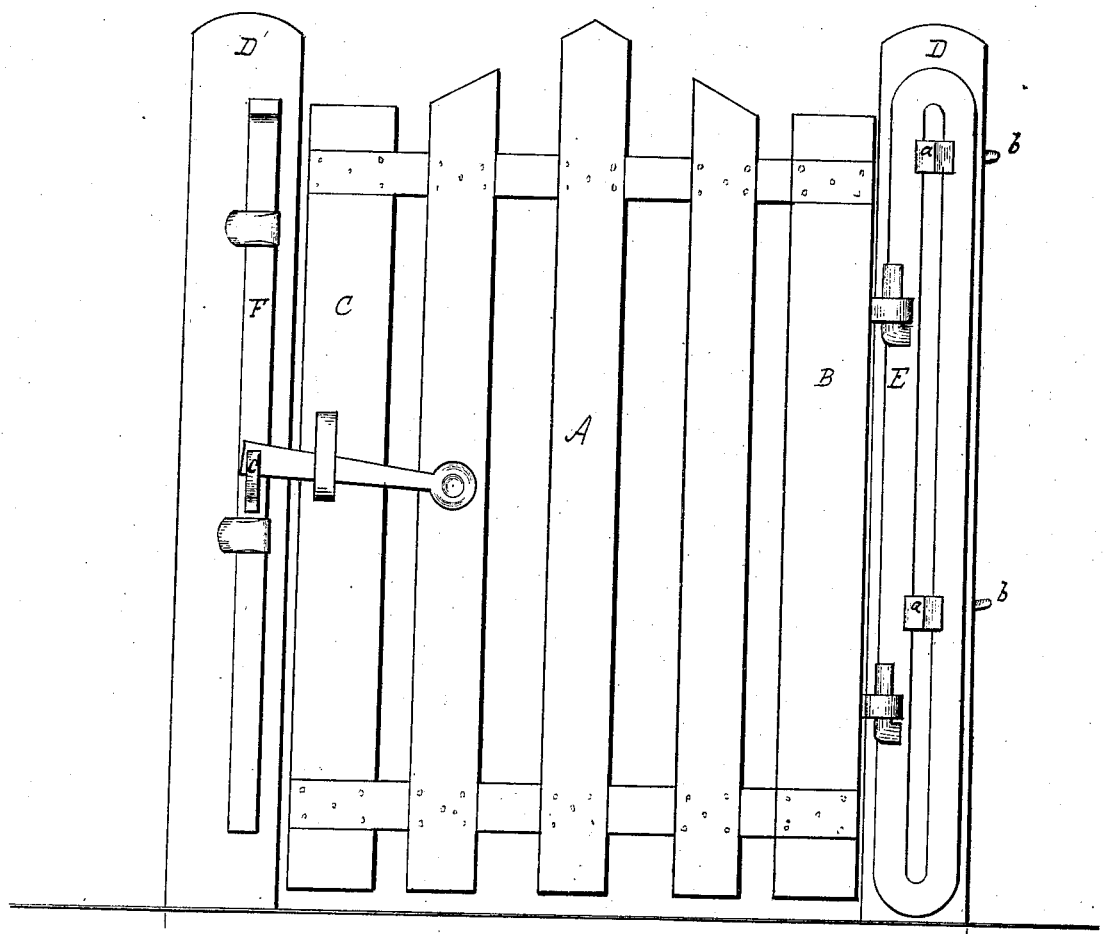
Figure 1 is a front elevation of my gate.
Figure 2:
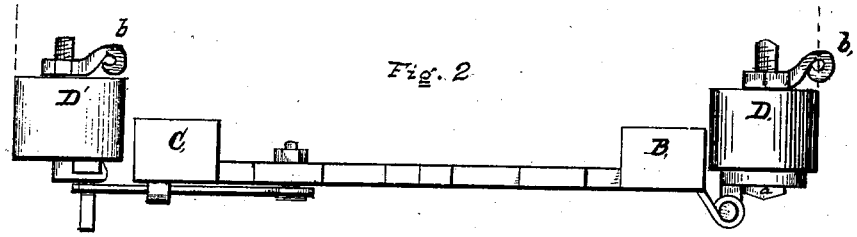
Figure 2 is a plan or top view.

Let A represent the gate;
B, the hanging-stile; and
C, the latching-stile.
D D' are the gate-posts.

The gate is not hinged directly to the post D, but is furnished with lugs, which engage with corresponding eyes, the latter being forged with or otherwise rigidly secured to a slotted metallic plate, E.

Hook-bolts, $a\ a$, pass through the slotted plate E and the post D, above and below, and are provided with wing-nuts, $b\ b$, at the back of the post.

By loosening these nuts the plate may be moved up or down on the face of the post a limited distance, and the gate will of course be correspondingly moved.

When the nuts are screwed up tight the gate will remain in place.

A plate, F, bearing a wipe or catch, $c$, for latching, is secured to the post D' in a manner similar to the arrangement above described.

This plate must be so placed with reference to the plate E that the gate will latch properly.

I do not claim any of the devices herein shown or described, *per se;* but

What I claim as my invention is—

The slotted plate E provided with pintles, the bar or plate F provided with the catch $c$, the double and single-headed clamping-screws with their winged-nuts, arranged, as shown and described, in connection with the gate A and posts D D', whereby said gate may be adjusted and latched, as specified.

NOAH PARKER.

Witnesses:
SAML. G. REORDAN,
ELIZA B. G. PARKER.